UNITED STATES PATENT OFFICE.

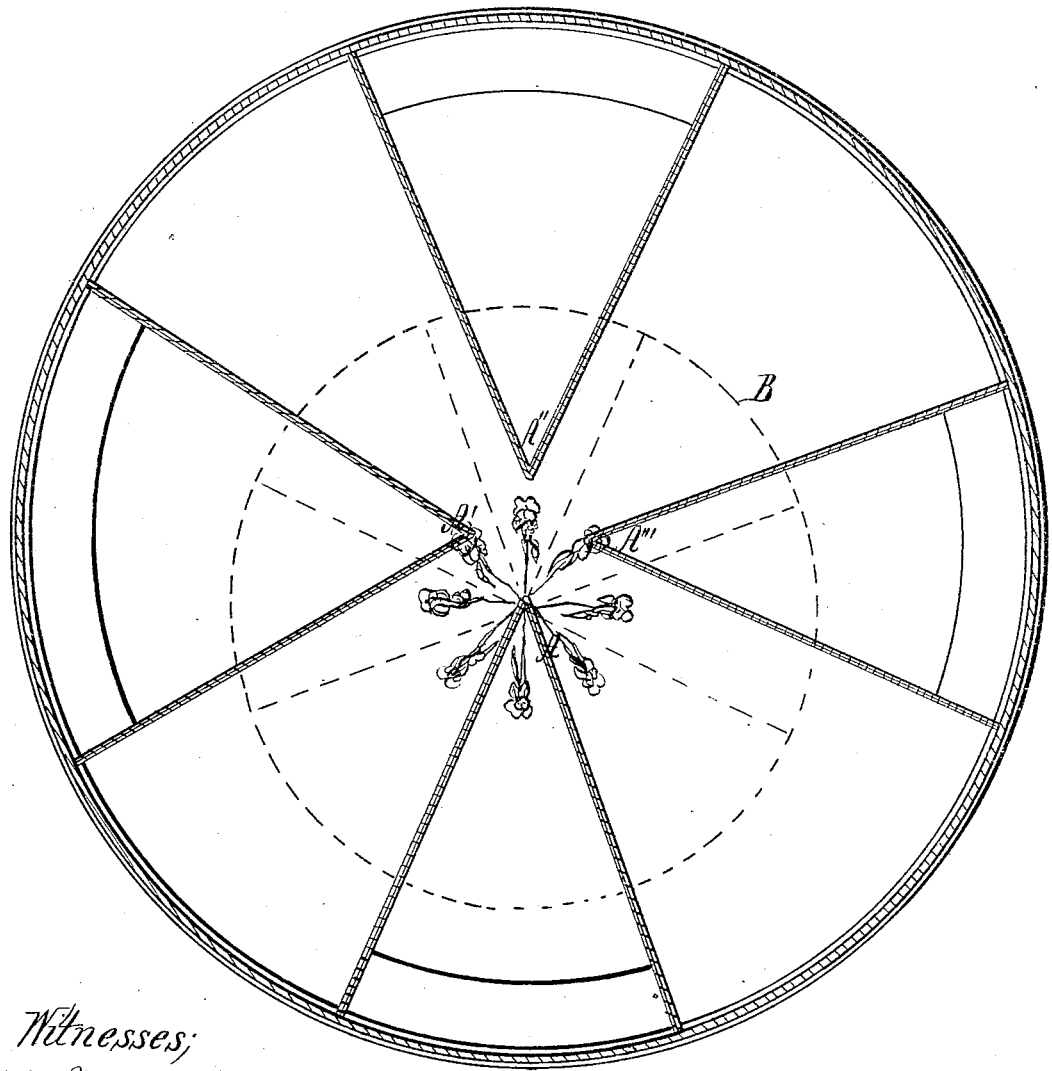

A. C. McNULTY AND D. LYMAN, JR., OF NEW YORK, N. Y.

KALEIDOSCOPE.

Specification of Letters Patent No. 30,238, dated October 2, 1860.

*To all whom it may concern:*

Be it known that we, A. C. McNULTY and D. LYMAN, Jr., both of the city, county, and State of New York, have invented certain new and useful Improvements in Kaleidoscopes; and we do hereby declare that the following is a full, clear, and exact description of the same, reference being had to the accompanying drawing, forming a part of this specification, in which—

The figure represents a horizontal section of our invention.

Since the invention of the kaleidoscope manifold experiments have been made, to turn these neat and entertaining instruments to a useful purpose, and not without success, for it has recently been found that by the aid of a kaleidoscope beautiful patterns for embroidery, or for printing, or for engraving etc., can be produced. The manner in which this is effected, is as follows: A small picture of a flower or a piece of lace or anything which may be found to serve the purpose is placed under the kaleidoscope, and the picture produced by the same is copied by means of a photographic camera. The success of this operation depends in a great measure upon the angle of the kaleidoscopic mirrors and it sometimes happens that by placing the mirrors at a certain angle the picture which is produced, gives no satisfaction at all, whereas if the angle can be changed and made either larger or smaller, the most satisfactory result is obtained. For this reason we have arranged our kaleidoscope in such a manner, that the same contains a number of mirrors placed at different angles and that the angle of the mirrors can be adapted to the picture to be produced, or that several different pictures can be produced with the same instrument.

To enable those skilled in the art to make and use our invention we will proceed to describe it with reference to the drawing.

A number of kaleidoscopic mirrors A, A', A'', A''', the angles of which vary from 40 to 60 degrees are arranged in the same case B. If a picture is to be taken the original is placed under one pair of mirrors and if it is found to give a satisfactory result, the kaleidoscopic picture is copied; but if it is found to give no satisfactory result, the case B, is turned and another pair of mirrors is brought over the original until the desired result is obtained.

By the aid of these improvements we are enabled to take kaleidoscopic pictures from any pattern; and the pictures produced by the aid of our instruments are sure to give the best possible effect and at the same time we are enabled, to produce from the same pattern a number of different pictures by varying the angle of the mirrors.

Having thus fully described our invention, what we claim as new and desire to secure by Letters Patent is—

The arrangement of two or more pairs of kaleidoscopic mirrors A in one case B, substantially as and for the purpose set forth.

A. C. McNULTY.
      D. LYMAN, Jr.

Witnesses:
 L. W. BENDRÉ,
 JNO. H. SCOTT.